(12) United States Patent
Tav et al.

(10) Patent No.: US 11,500,554 B2
(45) Date of Patent: *Nov. 15, 2022

(54) ACCESS REVOCATION MESSAGING MECHANISM

(71) Applicant: International Business Machines Corporation, Armonk, NY (US)

(72) Inventors: Doga Tav, Fredericton (CA); Wayne F. Tackabury, West Tisbury, MA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 17/166,310

(22) Filed: Feb. 3, 2021

(65) Prior Publication Data

US 2021/0157490 A1    May 27, 2021

Related U.S. Application Data

(63) Continuation of application No. 16/519,900, filed on Jul. 23, 2019, now Pat. No. 10,996,874.

(51) Int. Cl.
| | |
|---|---|
| *G06F 3/06* | (2006.01) |
| *H04L 9/08* | (2006.01) |
| *G06F 12/0891* | (2016.01) |
| *H04L 9/32* | (2006.01) |

(52) U.S. Cl.
CPC ........... *G06F 3/0623* (2013.01); *G06F 3/067* (2013.01); *G06F 3/0652* (2013.01); *G06F 12/0891* (2013.01); *H04L 9/0891* (2013.01); *H04L 9/321* (2013.01); *G06F 2212/601* (2013.01)

(58) Field of Classification Search
CPC ...... G06F 3/0623; G06F 3/0652; G06F 3/067; G06F 12/0891; G06F 2212/601; H04L 9/0891; H04L 9/321
See application file for complete search history.

(56) References Cited

U.S. PATENT DOCUMENTS

| | | | |
|---|---|---|---|
| 9,298,923 B2 | 3/2016 | Salowey et al. | |
| 10,320,757 B1 | 6/2019 | Secker-Walker et al. | |
| 10,412,215 B2 | 9/2019 | Moshir et al. | |
| 10,419,219 B1* | 9/2019 | Wieker | H04W 12/04 |

(Continued)

OTHER PUBLICATIONS

"Regulation (EU) 2016/679 of the European Parliament and of the Council", Apr. 27, 2016. https://publications.europa.eu/en/publication-detail/-/publication/3e485e15-11bd-11e6-ba9a-01aa75ed71a1/language-en.

*Primary Examiner* — Idriss N Alrobaye
*Assistant Examiner* — Richard B Franklin
(74) *Attorney, Agent, or Firm* — Troutman Pepper Hamilton Sanders LLP

(57) ABSTRACT

An access revocation system for removing user data from a service provider device includes a processing device and a memory storing instructions for performing an access revocation method. The method includes receiving user data from a user device via a data channel, storing the user data in a data storage module, and receiving an access revocation message via a request channel separate from the data channel. The method also includes decrypting the access revocation message and performing at least one action defined by the access revocation message, the at least one action including scrubbing of user data from the data storage module.

20 Claims, 5 Drawing Sheets

(56) References Cited

U.S. PATENT DOCUMENTS

| | | |
|---|---|---|
| 10,423,558 B1 | 9/2019 | Fukami et al. |
| 2009/0265314 A1 | 10/2009 | Kindsvogel et al. |
| 2010/0077463 A1 | 3/2010 | Rickelton |
| 2010/0192211 A1 | 7/2010 | Bono et al. |
| 2016/0275300 A1* | 9/2016 | Ko .................... G06F 21/31 |
| 2018/0083778 A1 | 3/2018 | McCallum et al. |
| 2019/0171829 A1 | 6/2019 | Tackabury et al. |
| 2021/0026544 A1 | 1/2021 | Tav et al. |

\* cited by examiner

| Name | Action | Timeout(s) | State | Group |
|---|---|---|---|---|
| Component 1 | python script | 60 | rewrite file contents with random data | filesystem |
| Component 2 | DB schema flush | 30 | no db schema | DB |
| Component 3 | command | 20 | zero data files in directory | Filesystem |
| Component 4 | flush cache | 10 | no object in memory | cache |

FIG. 4

ACCESS REVOCATION MESSAGING MECHANISM

CROSS REFERENCE TO RELATED APPLICATIONS

This application is a continuation of U.S. patent application Ser. No. 16/519,900, filed on Jul. 23, 2019, which is incorporated herein by reference in its entirety.

TECHNICAL FIELD

The present application relates generally to controlling access to data and, more particularly, to a system and method having a data access revocation messaging mechanism.

BACKGROUND

Access control has been a key issue in a software data pipeline for many years, especially if the pipeline is distributed among a plurality of customer/provider stakeholders deployed in a multitenant environment, such as a cloud computing environment. Segregated data is another concern in the multitenant environment, where the data can be spread across a plurality of data centers over different geographic areas corresponding to the plurality of stakeholders having a business relationship.

European Union General Data Protection Regulation (GDPR) specifies a framework and regulatory basis for all data-handling stakeholders, e.g., network software service providers in acquisition and retention of the customer data for regression and performance tests. In compliance with GDPR, there is a need for a customer who generates and provides packet data to thoroughly control access to the generated customer data which is shared with other data-handling stakeholders. For example, the customer should be entitled and able to revoke the access to the generated customer data at any time.

The present disclosure addresses these and other issues related to data flow and access.

SUMMARY

In some embodiments, a method for data access revocation includes receiving customer data from a customer device via a data channel, storing the customer data in a data storage module, and receiving an access revocation message via a request channel separate from the data channel. The method also includes decrypting the access revocation message and performing at least one action defined by the access revocation message, the at least one action including scrubbing of customer data from the data storage module.

In another illustrative embodiment, a computer program product comprising a computer usable or readable medium having a computer readable program is provided. The computer readable program, when executed on a processor, causes the processor to perform various ones of, and combinations of, the operations outlined above with regard to the method illustrative embodiment.

In yet another illustrative embodiment, a system is provided. The system may comprise a processor configured to perform various ones of, and combinations of, the operations outlined above with regard to the method illustrative embodiment.

Additional features and advantages of this disclosure will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures:

FIG. 4 is a chart with exemplary access revocation messages, according to embodiments provided herein.

DETAILED DESCRIPTION

Figure 1:
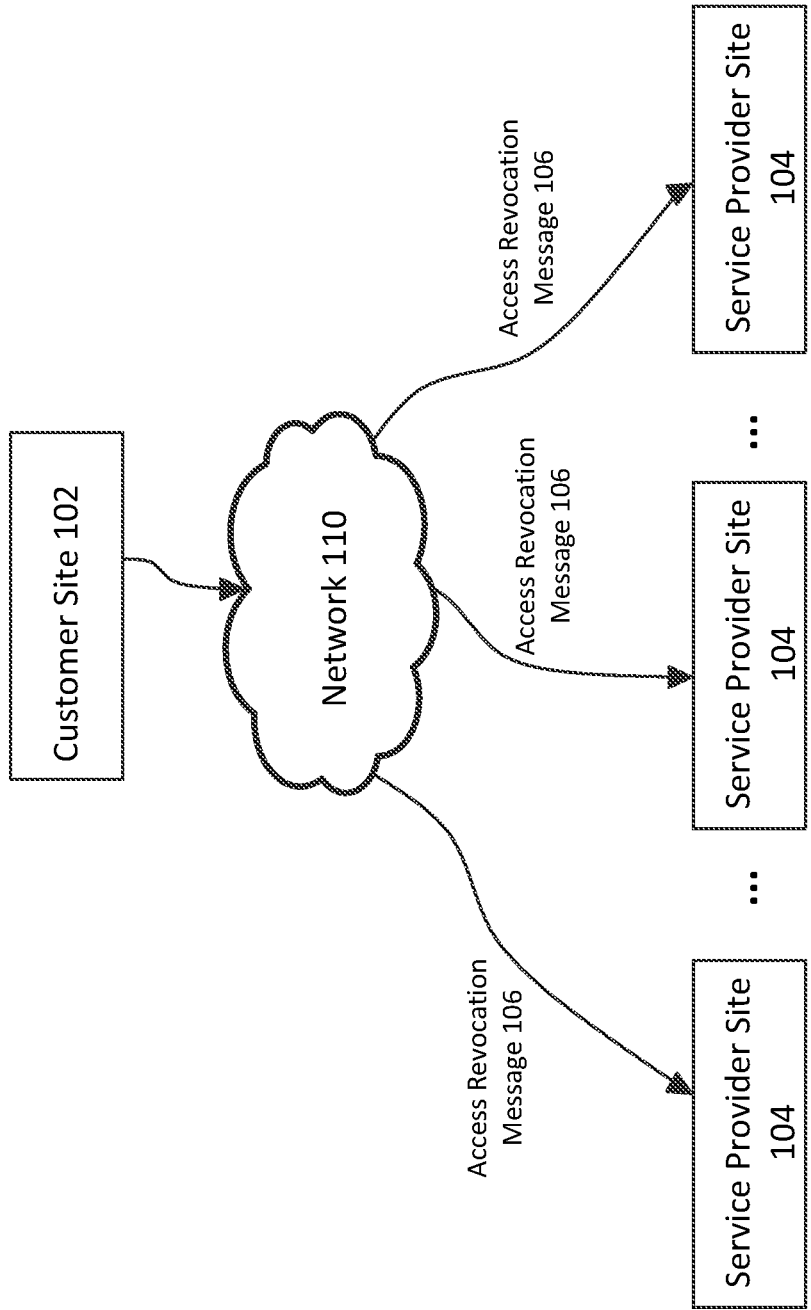
FIG. 1 is a diagram depicting an architecture for transferring data between a customer site and a service provider site, according to embodiments provided herein.

Embodiments of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a head disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN) and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including LAN or WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

According to embodiments disclosed herein, a method, system, and computer product of controlling access to customer data in a multitenant environment are provided. In an embodiment, a customer site can revoke or terminate the access to the customer data by disabling a symmetric key pair, which is used for encryption and decryption of customer data (raw packet data) at a service provider site. The system may use a messaging model (e.g., using an off-the-shelf communication system, such as Apache Kafka, or the like) between components that have access to the customer data. The individual components may be subscribed to receive a notification in the event that a customer decides to halt the execution and/or stop the data stream to the system.

In an embodiment, upon revocation of access requested by the customer site (e.g., a predefined message for revoking data access is sent from the customer site to one or more service provider sites), one or more service provider sites which are using the customer data will relinquish access to the customer data, and any cached customer data or/and customer data stored in one or more permanent storage devices will be scrubbed and removed from the one or more service provider sites. The message may include content that defines particular actions to be taken by the component.

Disclosed embodiments may include at least two messaging channels between customer components and subscriber components. One communication channel may be used to convey key data (e.g., a "data channel"), while the other communication channel is used for notification of new requests, such as revocation request messages (e.g., a "notification channel"). Keysets as exchanged from customer to service provider are provided with a persistent opaque identifier, which may be used as an indexing parameter for the duration of a key visibility lifecycle.

FIG. 1 is a diagram depicting an architecture 100 of revoking a data access in a multitenant environment, according to embodiments provided herein. As shown in FIG. 1, in an embodiment, a customer site 102 is functionally connected to a plurality of service provider sites 104 for providing access to customer data via a network 110. For example, a service provider site 104 may provide a benchmarking service which requires acquisition and retention of the customer data for regression and performance tests. As used herein, the term "site" may refer to a device or system, such as a customer system or customer service system, including a plurality of devices and/or systems. For example, the customer site 102 may be a customer system including networked devices.

As another example, a service provider site 104 may provide a cloud-based computing service which requires acquisition and retention of the customer data for computing. According to disclosed embodiments, the customer site 102 may control the access of the service provider sites 104 to the customer data. For example, the customer site 102 may revoke the access of any service provider site 104 to the customer data by sending an access revocation message 106. The customer site 102 may communicate with the service provider sites 104 via a network 110.

In an exemplary embodiment, the access revocation message 106 is defined in a JavaScript Object Notation (JSON) format. The access revocation message 106 may include name, action, timeout, state, group, and other parameters. Upon receipt of the access revocation message 106, the corresponding service provider site 104 will relinquish access to the customer data. Meanwhile, any cached customer data (e.g., customer data in clearcache or/and cryptcache), customer data stored in one or more permanent storage devices (e.g., SOLR data sets), objects in a local memory, database tables, and a database schema will be scrubbed and removed from the service provider site 104. The service provider site 104 reports the state of each component, e.g., clearcache, cryptcache, a relational database, a local memory, etc., to the customer site 102. For example, the state of "no database schema," "zero data files in directory," "no object in memory," etc. will be reported to the customer site 102. The state information can be kept for a predefined period of time (e.g. one year) for network audit.

In an embodiment, the access revocation message 106 can be authenticated by an encryption scheme, such as Rivest-Shamir-Adleman (RSA) trapdoor scheme. The customer site 102 can sign the access revocation message 106 using its private key, and the service provider site 104 can decrypt the access revocation message 106 using the customer site's public key. In this way, a fake access revocation message sent from any site other than the customer site 102 can be identified and ignored. In another embodiment, for added security, the JSON file which provides a configuration of access revocation can be encrypted using a predefined password, and the service provider site 104 is required to input the password to open the JSON file. In an embodiment, a specific scrub keyword can be defined.

The network 110 may be a local or global network and may include wired and/or wireless components and functionality which enable internal and/or external communication for components of the architecture 100. The network 110 may be embodied by the Internet, provided at least in part via cloud services, and/or may include one or more communication devices or systems which enable data transfer to and from the systems and components of the architecture 100.

Figure 2:
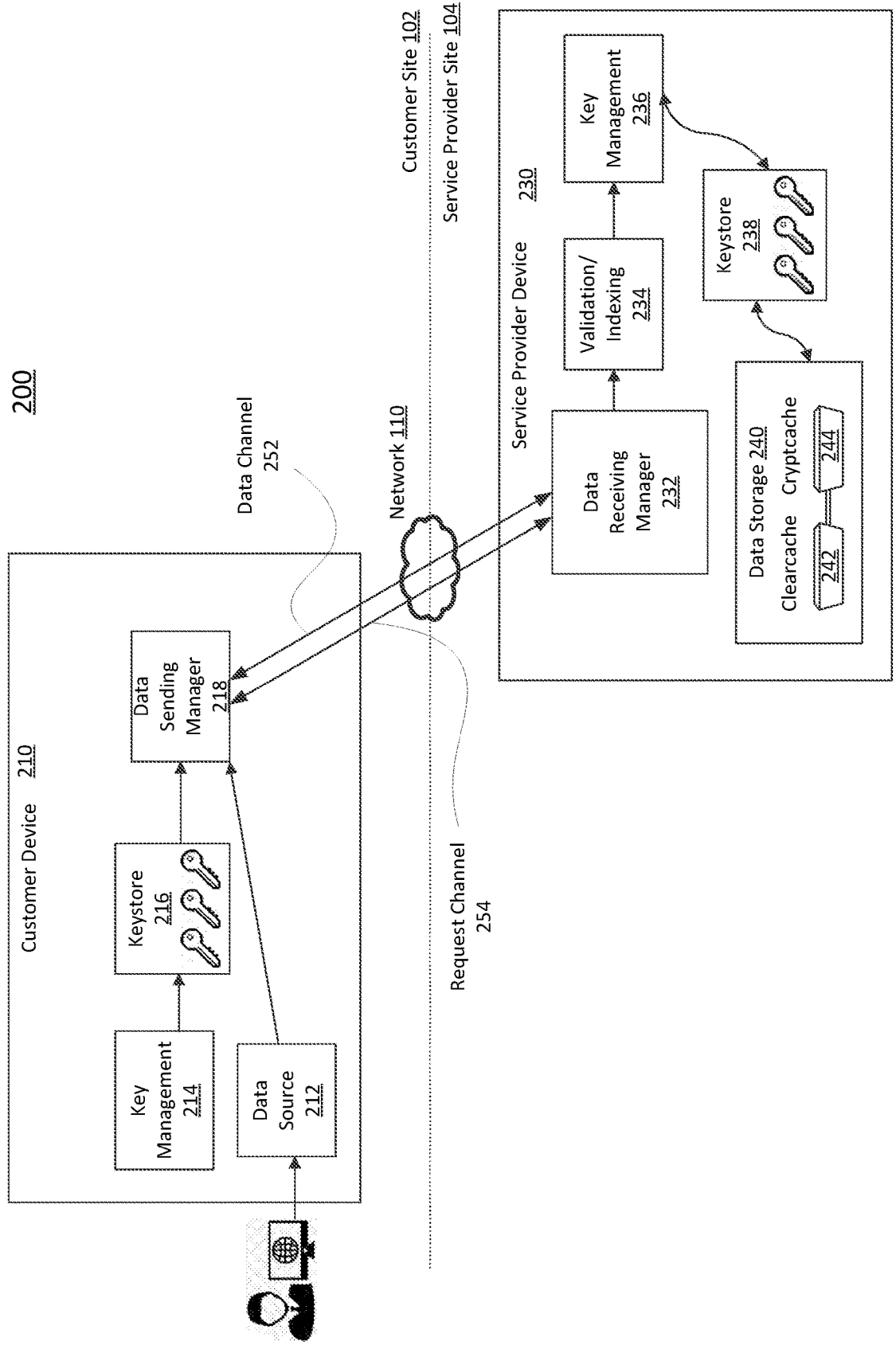
FIG. 2 is a diagram depicting an architecture of a customer site and a service provider site, according to embodiments provided herein.

FIG. 2 is a diagram depicting an exemplary system architecture 200 for transferring data between a customer device 210 on the customer site 102 and a service provider device 230 on the service provider site 104. The system architecture 200 may enable the customer device 210 to revoke access to the data provided to the service provider device 230, according to embodiments provided herein.

The customer device 210 may be a computing device (e.g., a server, a desktop or laptop computer, mobile device, etc.). The service provider device 230 may also be a computing device (e.g., a server, a desktop or laptop computer, mobile device, etc.). The customer device 210 may communicate with the service provider device 230 to control the flow of data via the network 110. In an exemplary embodiment, the customer device 210 may be connected to the service provider device 230 via at least two channels, including a data channel 252 and a request channel 254.

In an exemplary embodiment, the customer device 210 includes a data source 212, a key management module 214, a keystore 216, and a data sending manager 218. The components of the customer device 210 may be software and/or hardware modules configured to perform one or more steps of an associated process. The components of the customer device 210 that are shown are exemplary and additional or alternative components may be provided.

The data source 212 may be a data repository that receives, stores, generates, encrypts, or otherwise produces data associated with the customer site 102. The data source 212 may provide raw packet data that is continuously collected on a predetermined periodic basis—e.g., an hourly basis, at the customer site 102. The data source 212 may provide the packet data to the data sending manager 218. The key management module 214 and keystore 216 may be configured to provide encryption information to the data sending manager 218. The data sending manager 218 may be configured to send the data to the service provider device 230 via the data channel 252. The data sending manager 218 may also be configured to send an access revocation message 106 via the request channel 254.

In an exemplary embodiment, the service provider device 230 includes a data receiving manager 232, a validation/indexing module 234, a key management module 236, a keystore 238, and a data storage module 240. The components of the service provider device 230 may be software and/or hardware modules configured to perform one or more steps of an associated process. The components of the service provider device 230 that are shown are exemplary and additional or alternative components may be provided.

The data receiving manager 232 may be configured to receive data from the customer device 210 via the data channel 252. The data receiving manager 232 may also be configured to receive an access revocation message 106 via the request channel 254. The validation/indexing module 234 may be configured control and/or route validation and/or organization of received data. The key management module 236 and keystore 238 may be configured to decrypt received data. The data storage module 240 may be configured to store received customer data and may include clearcache 242 and cryptcache 244.

In an exemplary embodiment, customer data, i.e., the raw packet data, is encrypted using a first key (e.g., a public key) of one symmetric key pair provided by the key store 216. The encrypted data is then transferred to the cryptcache 244 located at the service provider site 104, e.g. a benchmarking site. A second key (a private key which is paired with the public key) of the same symmetric key pair is provided from the key management module 214 to the cryptcache 244, through the keystore 216 and the data sending manager 218. The encrypted data is decrypted using the second key in the cryptcache 224. The decrypted data is then stored in the clearcache 242 in a cleartext form. The decrypted data is indexed in the clearcache 242. Each customer data packet is provided with an index, so that each decrypted customer data packet (in cleartext form) can be retrieved through a search. The indexed one-hour customer data (including indices and packet data in cleartext form) is then stored as a data set in a permanent storage device (e.g., a database in the data storage module 240). Each period of customer data, e.g., each one-hour customer data is stored as a separate data set (e.g., SOLR data set), and thus there are a plurality of data sets in the permanent storage device. An architecture of transferring customer data between the customer site and the service provider site is detailed in U.S. patent application Ser. No. 16/208,971, filed on Dec. 4, 2018, entitled "Secure Data Transfer Architecture for Benchmarking," which is incorporated herein by reference in its entirety.

The key management module 214 at the customer site 102 is configured to generate symmetric key pairs that are stored in the keystore 216, refresh symmetric key pairs periodically, and send out symmetric key pairs stored in the keystore 216 for encryption or decryption. The data receiving manager 232 at the service provider site 104 is configured to request a second key from the keystore 216 for decryption in the cryptcache 244 and monitor the Time to live (TTL) value for each second key transferred from the customer site 102. The key management module 214 and the data receiving manager 232 may be implemented in any suitable manner using known techniques that may be hardware-based, software-based, or some combination of both. For example, one or more of the components of the customer device 210 and/or service provider device 230 may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system).

In an embodiment, the clearcache 242 at the service provider site 104 is a portion of cache memory (e.g., any level of cache memory (e.g., L1, L2, L3, etc.)) that stores an instance of a data object in cleartext form, and the cryptcache 244 is a portion of cache memory (e.g., any level of cache memory (e.g., L1, L2, L3, etc.)) that stores an instance of a data object in encrypted form. In some embodiments, the clearcache 242 and the cryptcache 244 may comprise designated portions, blocks, entries, or lines of one or more levels of cache memory that are used to store cleartext and encrypted instances, respectively, of data being processed according to the present disclosure (e.g., exclusively). However, it should be understood that the clearcache 242 and the cryptcache 244 may be defined as any particular portion, block, entry, or line of cache memory that is used to store data in a cleartext or encrypted form, respectively, while such data is being processed (e.g., temporarily and/or non-exclusively). Thus, it should also be understood that while a certain entry of cache memory may be considered as the clearcache 242 and the cryptcache 244 when storing therein the respective cleartext or encrypted form of data, such cache memory locations may also be used for other data caching purposes. The clearcache 242 and the cryptcache 244 each have an access time window defining an amount of time, during which the instance of the data object is accessible.

In an embodiment, the key management module 214, the keystore 216, the clearcache 242, the cryptcache 244, and the data packets sent via the data channel 252 (e.g., SOLR data sets) are all provided at the service provider site 104. The data receiving manager 232 is configured to monitor the Time to live (TTL) value for each private key transferred from the customer site 102, and send a key request to the data sending manager 218 at the customer site. Time to live (TTL) is a mechanism that limits the lifespan or lifetime of each private key for security consideration. The key received from the data sending manager 218 is stored in the keystore 238 via the key management module 236.

In an embodiment, the customer has an option to cancel the service provided by the service provider site 104, e.g. a benchmark service) at any time. In other words, the customer has an option to revoke the access of any component at the service provider site 104 to the customer packet data at any time. In this case, all of the packet data, indices, keys, etc. need to be removed from the service provider device 230. Specifically, the data in the clearcache 242 and the cryptcache 244 are to be scrubbed or removed. The keys (private keys or public keys) stored in the keystore 238 are also scrubbed or removed. Any indices or other organizational data generated by the validation/indexing module 234 should also be removed.

Figure 3:
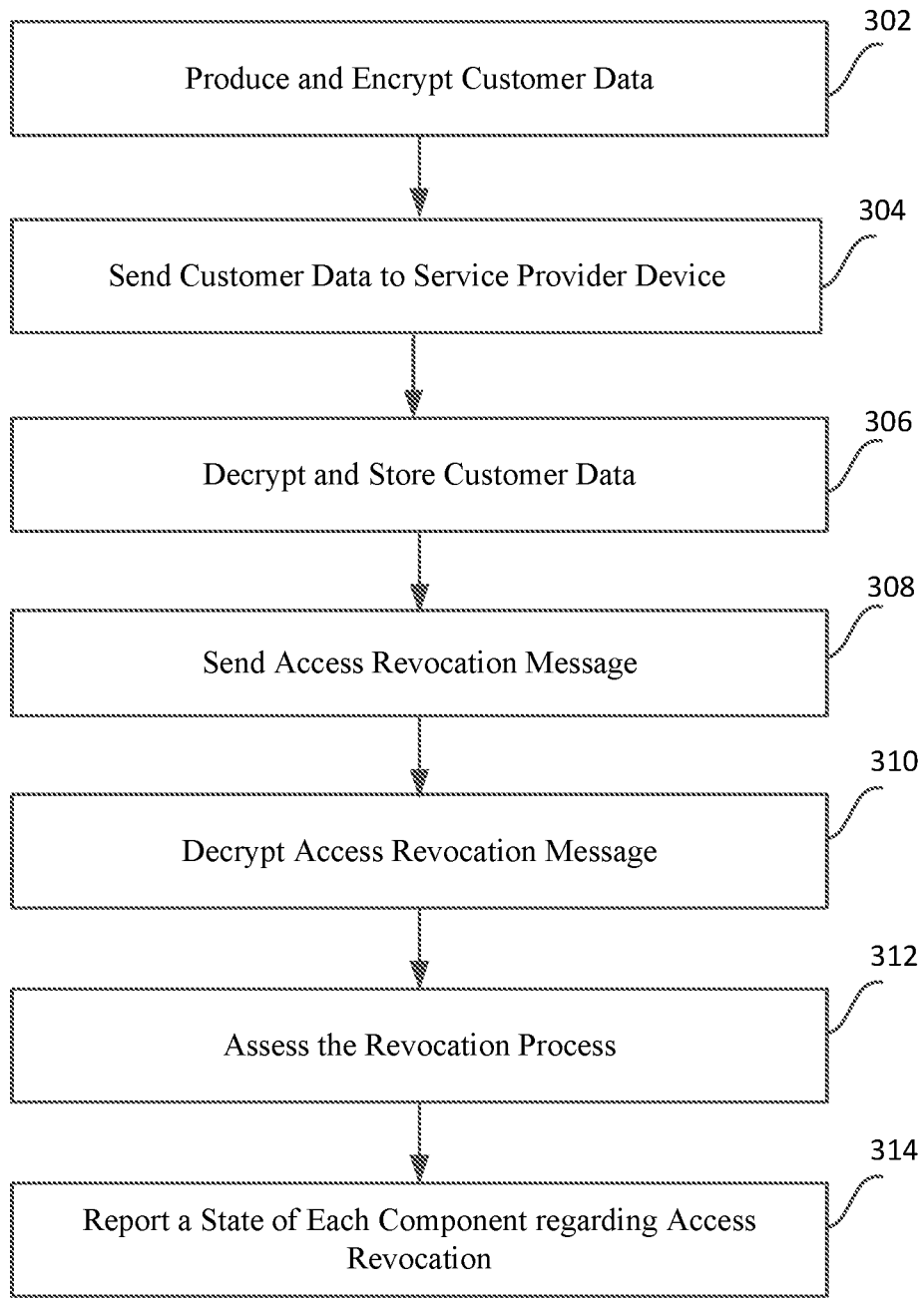
FIG. 3 is a flowchart of an exemplary data access process, according to embodiments provided herein.

FIG. 3 is a flowchart illustrating a method 300 of revoking a data access, according to embodiments provided herein. In an exemplary embodiment, the customer device 210 and/or the service provider device 230 may perform one or more steps of the process 300 via execution of software via one or more associated processing devices. At step 302, the customer device 210 produces and encrypts customer data. At step 304, the customer device 210 sends and the service provider device 230 receives customer data. As described herein, the data may be encrypted. At step 306, the service provider device 230 decrypts and stores (temporarily and/or permanently) the customer data. Steps 302-306 may repeat such that a stream of data is delivered via the data channel 252.

At step 308, an access revocation message 106 is sent by the customer device 210 and is received by the service provider device 230 via the request channel 254. In an embodiment, the service provider sites 104 subscribe to the data channel 252 and subscribe to the request channel 254. The data sending manager 218 may store a list of subscribed components (e.g., service provider device 230) and their respective revocation actions (commands to execute to scripts to run for revocation and verification, etc.). The data sending manager 218 may use this information to deliver the access revocation message 106 to a correct service provider device 230, where it is received by the data receiving manager 232.

In an embodiment, the access revocation message 106 can by encrypted using a public key or a private key prior to sending to the service provider site 104. In another embodiment, the access revocation message 106 can be encrypted using a trapdoor secret index. Trapdoor refers to a property of a number of asymmetric key transformations, where a transformational function $f_s: D \rightarrow R$ is a one-way transformation function, unless an identity of s has been provided to allow an inversion of the transformation. Exchange of such a secret through means outside of the interparty notification channel would allow efficient means of secondary encryption, avoiding exposure to any MITM intercept process. In another embodiment, the access revocation message 106 can be encrypted using Pretty Good Privacy (PGP) scheme. In an embodiment, the access revocation message 106 is delivered through Apache Kafka.

At step 310, the service provider device 230 decrypts the encrypted access revocation message 106, and initiates a revocation process. In an embodiment, the commands to be executed are cancelled or removed, database schema is scrubbed or removed, the packet data in the cryptcache 244 and the clearcache 242 are scrubbed or removed, the packet data in the data storage module 240 are scrubbed or removed, objects in one or more local memories are scrubbed or removed, and the like. In another embodiment, the keys in the key management module 236, keystore 238, the cryptcache 244, and the data receiving manager 232 are scrubbed or removed. In an embodiment, the customer device 210 can define a password for scrubbing each component, such as cache, data sets, schema, etc. In another embodiment, scrubbing of different components can be segregated from each other.

At step 312, the customer device 210 assesses whether the access revocation process was successful. Due to removal of the decryption keys, decryption of the packet data received from the customer device 210 cannot be completed by the service provider site 104. The customer device 210 waits for a period of time (e.g., 60 seconds) predefined in the access revocation message 106 for the revocation operation. For example, the predefined period of time for cache flushing is 10 seconds, and the predefined period of time for database schema flushing is 30 seconds. If the revocation operation cannot be completed within the predefined period of time, then the revocation operation of the service provider site 104 is deemed to fail.

At step 314, the service provider device 230 reports the state of each component (e.g., whether access revocation was successful, unsuccessful, in-process, etc.) at the service provider site 104 to the customer site 102, i.e., an actor/initiator of the access revocation request. The state of each component can work as auditable, nonrepudiatable evidence of access revocation for a customer, i.e., a data owner. The auditable evidence can be used for upline auditing, e.g., GDPR. The revoked keys and key-encrypted data are no longer accessible at the service provider site 104. This can be achieved with a timeout configuration process at the customer site 102 and the timeout can be set by a customer. The customer device 210 may check the expected state of the component along with the corresponding timeout to reach the desired state.

FIG. 4 is a table providing example contents of an access revocation message. In an exemplary embodiment, the access revocation message may include features including the name of a component to be managed via the revocation process, an action to be completed, a timeout timing for assessing the process, an explanation of the state to be achieved via the revocation process, and a group within the service provider site. For example, the access revocation message may command the service provider device to flush cache such that there is no object in the associated memory.

Figure 5:
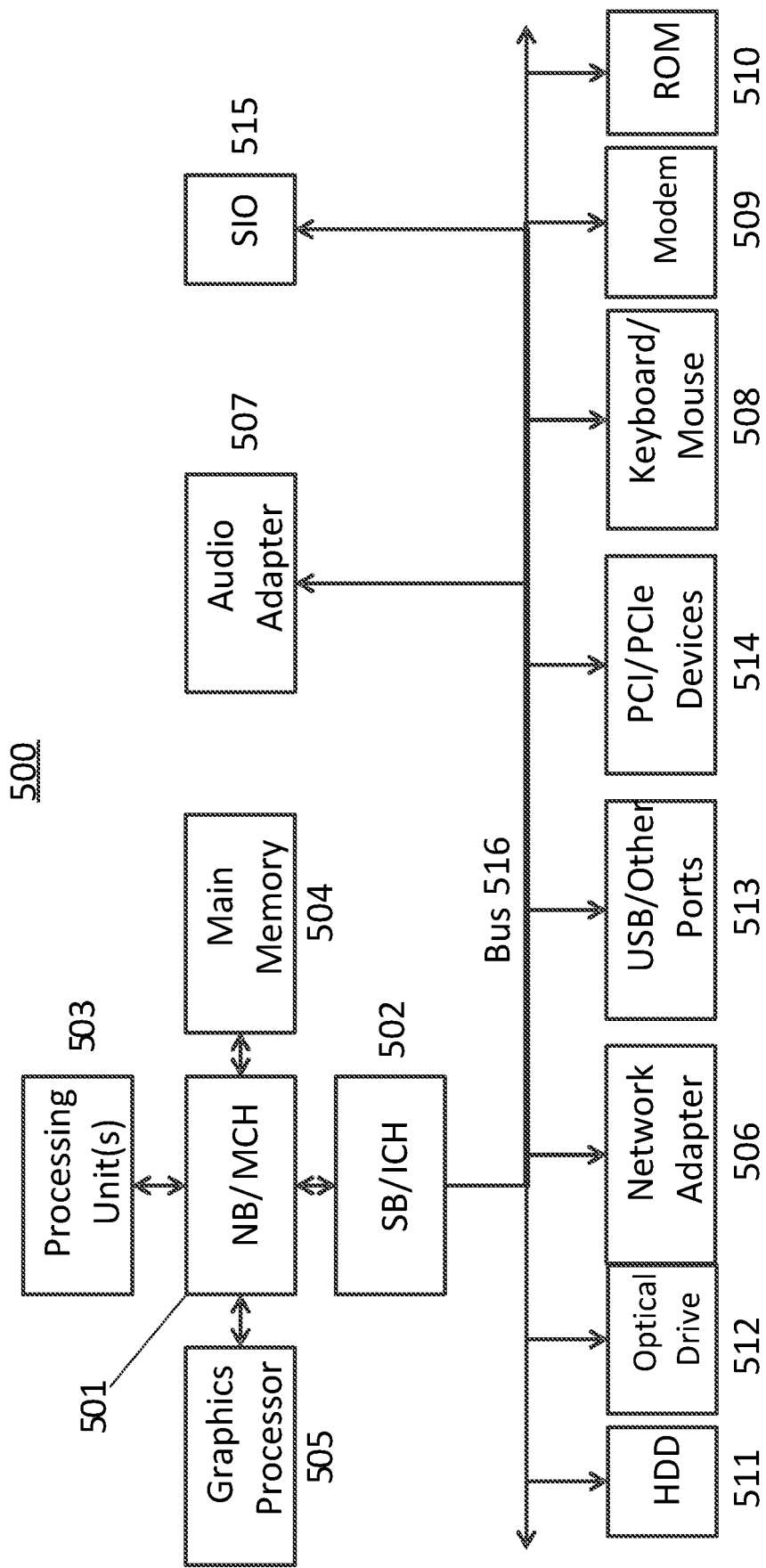
FIG. 5 is a block diagram of an example data processing system in which aspects of the illustrative embodiments are implemented.

FIG. 5 is a block diagram of an example data processing system 500, such as, but not limited to, benchmarking site computer or/and customer site computer, in which aspects of the illustrative embodiments may be implemented. Data processing system 500 is an example of a computer, such as a server or client, in which computer usable code or instructions implementing the process for illustrative embodiments of the present invention are located. In one embodiment, FIG. 5 may represent a server computing device.

In the depicted example, data processing system 500 can employ a hub architecture including a north bridge and memory controller hub (NB/MCH) 501 and south bridge and input/output (I/O) controller hub (SB/ICH) 502. Processing unit 503, main memory 504, and graphics processor 505 can be connected to the NB/MCH 501. Graphics processor 505 can be connected to the NB/MCH 501 through, for example, an accelerated graphics port (AGP).

In the depicted example, a network adapter 506 connects to the SB/ICH 502. An audio adapter 507, keyboard and mouse adapter 508, modem 509, read only memory (ROM) 510, hard disk drive (HDD) 511, optical drive (e.g., CD or DVD) 512, universal serial bus (USB) ports and other communication ports 513, and PCI/PCIe devices 514 may connect to the SB/ICH 502 through bus system 516. PCI/PCIe devices 514 may include Ethernet adapters, add-in cards, and PC cards for notebook computers. ROM 510 may be, for example, a flash basic input/output system (BIOS). The HDD 511 and optical drive 512 can use an integrated drive electronics (IDE) or serial advanced technology attachment (SATA) interface. A super I/O (SIO) device 515 can be connected to the SB/ICH 502.

An operating system can run on processing unit 503. The operating system can coordinate and provide control of various components within the data processing system 500. As a client, the operating system can be a commercially available operating system. An object-oriented programming system, such as the Java™ programming system, may run in conjunction with the operating system and provide calls to the operating system from the object-oriented programs or applications executing on the data processing system 500. As a server, the data processing system 500 can be an IBM® eServer™ System p® running the Advanced Interactive Executive operating system or the Linux operating system. The data processing system 500 can be a symmetric multiprocessor (SMP) system that can include a plurality of processors in the processing unit 503. Alternatively, a single processor system may be employed.

Instructions for the operating system, the object-oriented programming system, and applications or programs are located on storage devices, such as the HDD 511, and are loaded into the main memory 504 for execution by the processing unit 503. The processes for embodiments described herein can be performed by the processing unit 503 using computer usable program code, which can be located in a memory such as, for example, main memory 504, ROM 510, or in one or more peripheral devices.

A bus system 516 can be comprised of one or more busses. The bus system 516 can be implemented using any type of communication fabric or architecture that can provide for a transfer of data between different components or devices attached to the fabric or architecture. A communication unit such as the modem 509 or the network adapter 506 can include one or more devices that can be used to transmit and receive data.

Those of ordinary skill in the art will appreciate that the hardware depicted in FIG. 5 may vary depending on the implementation. Other internal hardware or peripheral devices, such as flash memory, equivalent non-volatile memory, or optical disk drives may be used in addition to or in place of the hardware depicted. Moreover, the data processing system 500 can take the form of any of a number of different data processing systems, including but not limited to, client computing devices, server computing devices, tablet computers, laptop computers, telephone or other communication devices, personal digital assistants, and the like. Essentially, data processing system 500 can be any known or later developed data processing system without architectural limitation.

The system and processes of the figures are not exclusive. Other systems, processes, and menus may be derived in accordance with the principles of embodiments described herein to accomplish the same objectives. It is to be understood that the embodiments and variations shown and described herein are for illustration purposes only. Modifications to the current design may be implemented by those skilled in the art, without departing from the scope of the embodiments. As described herein, the various systems, subsystems, agents, managers, and processes can be implemented using hardware components, software components, and/or combinations thereof. No claim element herein is to be construed under the provisions of 35 U.S.C. 112(f) unless the element is expressly recited using the phrase "means for."

The present description and claims may make use of the terms "a," "at least one of," and "one or more of," with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

We claim:

1. A computer implemented method in a data processing system comprising a processor and a memory comprising instructions, which are executed by the processor to cause the processor to implement a method of revoking access to user data, comprising:
   receiving user data from a user device via a data channel;
   storing the user data in a data storage module;
   receiving an access revocation message via a request channel separate from the data channel, wherein the access revocation message comprises:
      a first action to be performed on a first component, wherein the first action comprises scrubbing the user data, and the first component comprises the data storage module,
      a name of the first component, and
      an expected state of the first component; and
   performing the first action on the first component.

2. The method of claim 1, further comprising reporting a state of the first component.

3. The method of claim 1, wherein the access revocation message further comprises a timeout timing.

4. The method of claim 3, wherein the access revocation message is in JSON format.

5. The method of claim 1, wherein the access revocation message further comprises a grouping of the first action.

6. The method of claim 1, wherein the access revocation message further comprises:
   a plurality of actions, wherein each of the plurality of actions is to be performed on one of a plurality of components, and
   a plurality of names, wherein each of the plurality of names corresponds to one of the plurality of components,
   wherein the plurality of actions comprises the first action, the plurality of components comprises the first component, and the plurality of names comprises the name of the first component.

7. The method of claim 6, wherein one of the plurality of actions further comprises scrubbing of one or more decryption keys from a keystore.

8. The method of claim 1, wherein performing the first action is performed in response to submitting a password.

9. The method of claim 1, wherein receiving an access revocation message comprises receiving an encrypted access revocation message, the method further comprising:
   decrypting the encrypted access revocation message.

10. A service provider device comprising a processing device configured to execute software instructions to perform an access revocation process, the process comprising:
    receiving user data from a user device via a data channel;
    decrypting and storing the user data in a data storage module;
    receiving an access revocation message via a request channel separate from the data channel, wherein the access revocation message comprises:
       a plurality of actions, wherein each of the plurality of actions is to be performed on one of a plurality of components, wherein the plurality of actions comprises a first action to be performed on a first component, wherein the first action comprises scrubbing the user data, and the first component comprises the data storage module, and
       a plurality of names, wherein each of the plurality of names corresponds to one of the plurality of components, wherein the plurality of names comprises a name of the first component,
       wherein the plurality of components comprises the first component; and
    performing the first action on the first component.

11. The device of claim 10, wherein the data storage module comprises a cryptcache and a clearcache.

12. The device of claim 11, wherein one of the plurality of actions further comprises scrubbing one or more decryption keys from the cryptcache.

13. The device of claim 10, further comprising and reporting a state of the first component.

14. The device of claim 10, wherein the access revocation message is in JSON format.

15. The method device of claim 10, wherein the access revocation message further comprises an expected state of the first component.

16. The device of claim 10, wherein the performing the first action is performed in response to submitting a password.

17. A computer program product configured to perform an access revocation process, the computer program product comprising a computer readable storage medium having program instructions embodied therewith, the program instructions executable by a processor to cause the processor to:
    receive user data from a user device via a data channel;
    decrypt and store the user data in a data storage module;
    receive an access revocation message via a request channel separate from the data channel, wherein the access revocation message comprises:
       a plurality of actions, wherein each of the plurality of actions is to be performed on one of a plurality of components, wherein the plurality of actions comprises a first action to be performed on a first component, wherein the first action comprises scrubbing the user data, and the first component comprises the data storage module, and a plurality of names, wherein each of the plurality of names corresponds to one of the plurality of components, wherein the plurality of names comprises a name of the first component, wherein the plurality of components comprises the first component; and perform the first action on the first component.

18. The computer program product of claim 17, wherein performing the first action is performed in response to submitting a password.

19. The computer program product of claim 17, wherein the access revocation message further comprises an expected state of the first component.

20. A computer implemented method in a data processing system comprising a processor and a memory comprising instructions, which are executed by the processor to cause the processor to implement a method of revoking access to user data, comprising:

receiving user data from a user device via a data channel;

storing the user data in a data storage module;

receiving an access revocation message via a request channel separate from the data channel, wherein the access revocation message comprises:

a plurality of actions, wherein each of the plurality of actions is to be performed on one of a plurality of components, wherein the plurality of actions comprises a first action to be performed on a first component, wherein the first action comprises scrubbing the user data, and the first component comprises the data storage module, and a plurality of names, wherein each of the plurality of names corresponds to one of the plurality of components, wherein the plurality of names comprise a name of the first component, wherein the plurality of components comprises the first component; and performing the first action on the first component.

\* \* \* \* \*